United States Patent [19]
Richardson

[11] Patent Number: 5,260,898
[45] Date of Patent: Nov. 9, 1993

[54] RESULT CACHE FOR COMPLEX ARITHMETIC UNITS

[75] Inventor: Stephen Richardson, Stanford, Calif.

[73] Assignee: Sun Microsystems, Inc., Mountain View, Calif.

[21] Appl. No.: 851,176

[22] Filed: Mar. 13, 1992

[51] Int. Cl.$^5$ .............................................. G06F 7/38
[52] U.S. Cl. .................................................. 364/736
[58] Field of Search .......................... 364/736; 395/425

[56] References Cited

U.S. PATENT DOCUMENTS

| | | | |
|---|---|---|---|
| 4,156,906 | 5/1979 | Ryan | 395/425 |
| 4,314,331 | 2/1982 | Porter et al. | 395/425 |
| 4,598,365 | 7/1986 | Boothroyd et al. | 364/736 X |
| 4,831,581 | 5/1989 | Rubinfeld | 395/250 |

*Primary Examiner*—Tan V. Mai
*Attorney, Agent, or Firm*—Blakely Sokoloff Taylor & Zafman

[57] ABSTRACT

Individual multi-cycle statements or complex arithmetic units such as dividers, multipliers and adders are replaced with a fast, single-cycle cache lookup. This cache contains the results of a specific arithmetic operation using specified operands. These operands were previously utilized by the processor to perform an earlier, but duplicative, operation. Before performing a specific arithmetic operation, the cache is referenced to determine if the operation has been performed. If the operation has been performed, the result is output without the need to perform the multi-cycle arithmetic operation. Preferably, the operands of the arithmetic operation are hashed to form an index to perform a cache lookup. If the portion of the cache indicated by the index registers a "hit", the stored arithmetic result is output. When a cache miss occurs, the arithmetic operation is completed by the arithmetic unit. The result may then be stored in the cache indexed by the operands.

19 Claims, 10 Drawing Sheets 1.
2.

Figure 6a

| Algorithm A: |
|---|
| If (a+b) is odd, then index=1; else if (a+b) is even, then index=2. |

| Algorithm B: |
|---|
| If ones-digit-of(a)<5 then index=1; else if ones-digit-of(a)>4 then index=2. |

Figure 6b

| Equation | Index generated by | |
|---|---|---|
| | Algorithm A | Algorithm B |
| eq1: 147 x 4 | 1 | 2 |
| eq2: 317 x 24 | 1 | 2 |
| eq3: 16 x 100 | 1 | 2 |

Figure 6c

| index | result | cache tag |
|---|---|---|
| 1 | 7608 | 317, 24 |
| 2 | 1600 | 16, 100 |

Figure 6d

RESULT CACHE FOR COMPLEX ARITHMETIC UNITS

BACKGROUND OF THE INVENTION

1. Field of the Invention

The present invention relates to performance of complex arithmetic operations in a computing system. In particular, the present invention relates to the minimization of clock cycles required to perform arithmetic operations.

2. Background of the Invention

Complex arithmetic units such as dividers, multipliers and adders sometimes process the same sets of operands repeatedly. In the past, each time a familiar set of operands was received to be processed, the result was recalculated by the arithmetic unit, inefficiently wasting the unit's time and resources.

Because of the redundant nature of computation, certain optimizing shortcuts can be enacted to increase the speed of the process. The technique of memo-ization, or tabulation, takes advantage of the redundant nature of computation and allows a computer program to run faster by trading execution time for increased memory storage. Precomputed results of functions are stored in a table. A lookup to the table then replaces calls to the unit to execute the function.

However, a lookup table containing all variations of operands and their corresponding results would require a memory prohibitively large.

SUMMARY OF THE INVENTION

It is an object of the present invention to provide fast cache lookup for individual multi-cycle statements.

It is further an object of the present invention to minimize the amount of time for complex arithmetic units to perform repetitive calculations of respective operands.

In the present invention, individual multi-cycle statements or complex arithmetic units such as dividers, multipliers and adders can, in some instances, be replaced with a fast cache lookup. This cache would contain the results of a specific arithmetic operation using specified operands. These operands were previously utilized by the processor to perform an earlier, but duplicative, operation.

Before or coincident with performing a specific arithmetic operation, the cache is referenced to determine if the operation has been previously performed. If it has, the result is output without the need to complete the multi-cycle arithmetic operation. Preferably, the operands of the arithmetic operation are hashed to form an index to perform a cache lookup. If the portion of the cache indicated by the index registers a "hit", the stored arithmetic result is output. When a cache miss occurs, the arithmetic operation is completed by the arithmetic unit. The result may then be stored in the cache indexed by the operands.

BRIEF DESCRIPTION OF THE DRAWINGS

The objects, features and advantages of the present invention will be apparent from the following detailed description of the preferred embodiment in which:

FIGS. 6a–6f illustrate the generation of index and tags and the use of the same in the preferred embodiment of the present invention.

DETAILED DESCRIPTION OF THE INVENTION

In the following description, for purposes of explanation, specific memories, word lengths, organizations, components, architectures, etc. are set forth in order to provide a thorough understanding of the present invention. However, it will be apparent to one skilled in the art that the present invention may be practiced without the specific details. In other instances, well known circuits are shown in block diagram in order not to obscure the present invention unnecessarily.

Complex arithmetic units such as dividers, multipliers and adders tend to perform the arithmetic operation for identical pairs of operands. Thus, each time a set of operands is presented to the arithmetic unit, the result is recalculated, inefficiently wasting the arithmetic unit's time and resources. A result cache alleviates this problem, providing a mechanism whereby results are saved to avoid performing similar calculations in the future. The below discussion discusses the result cache as it would apply to a floating point division unit; however, this technique applies equally to a multiplicity of functional units, including floating point and fixed point adders, multipliers and dividers.

Floating point division of two numbers is a complex operation that requires much computation time. A lookup table containing all operands and results would provide results at a much greater rate than performing the computation. Unfortunately, a complete table covering all instances of 64-bit operand pairs would be prohibitively large (on the order of $2^{128}$ entries) and thus could not concurrently be produced at acceptable speeds.

By using a result cache, the observation that similar operand pairs arrive with a certain degree of temporal locality is taken advantage of. As each operand pair is provided to the arithmetic unit, the result cache is checked to see if the pair of operands and its result exist in the cache. If the operand pair exists in the cache, the result is output from the cache without the need to complete the arithmetic operation. If the operand pair does not exist in the cache, the arithmetic unit completes the arithmetic operation and the operand pair and result is stored in the result cache according to a predetermined cache replacement algorithm. This is illustrated in FIG. 1.

Figure 1:
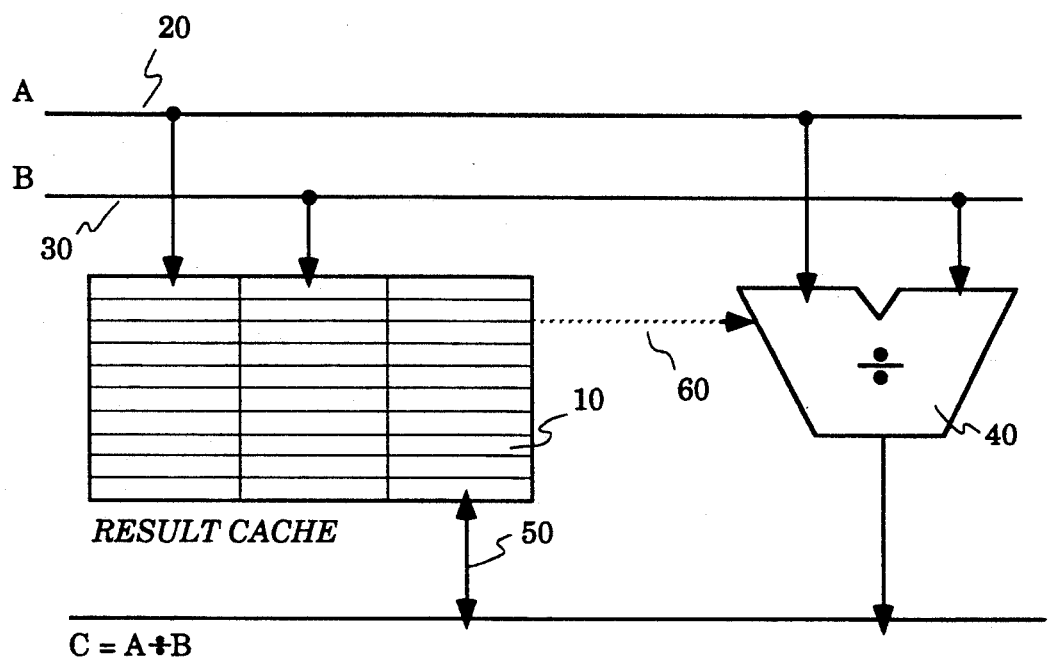
FIG. 1 illustrates a first embodiment of the result cache of the present invention.
Figure 2:
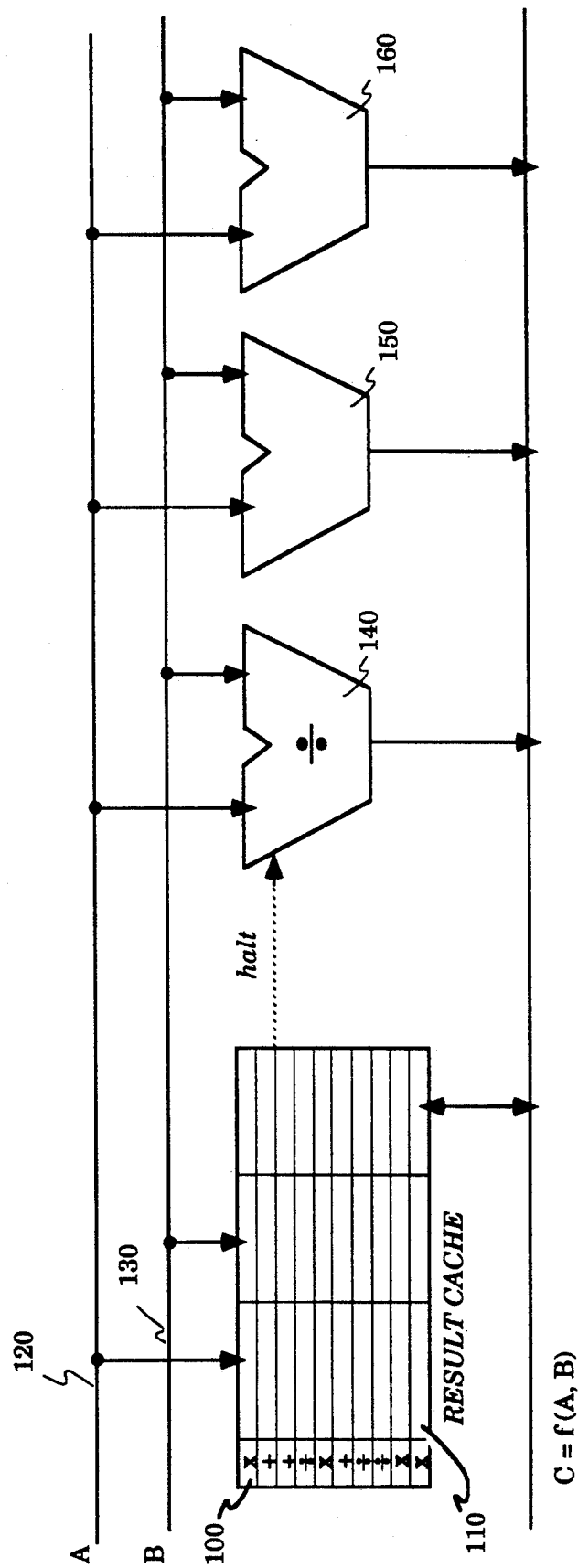
FIG. 2 illustrates an alternate embodiment in which the result cache can store the results for multiple arithmetic units.
Figure 3A:
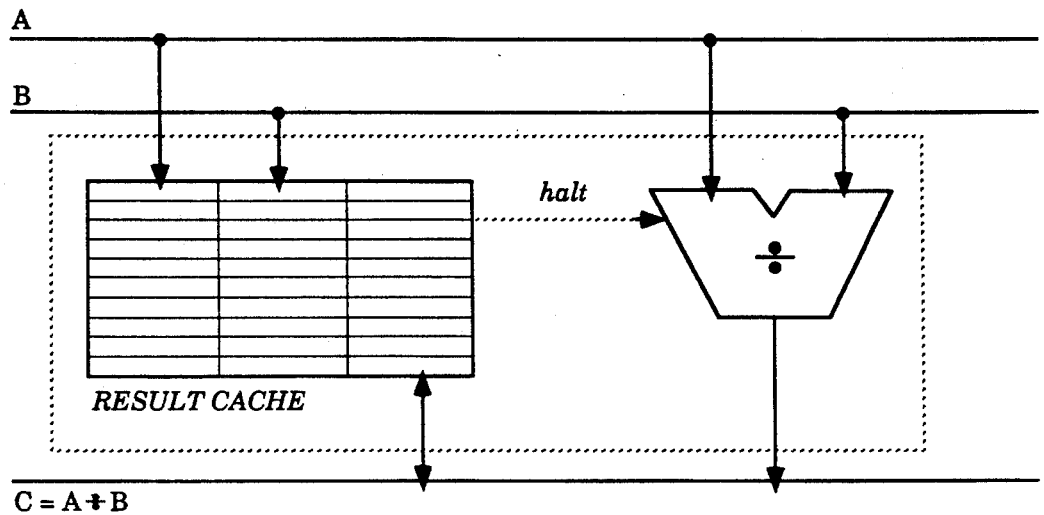
FIGS. 3a and 3b illustrate an alternate embodiment of the present invention in which the result cache is packaged together with a functional unit and packaged separately from the unit.
Figure 3B:
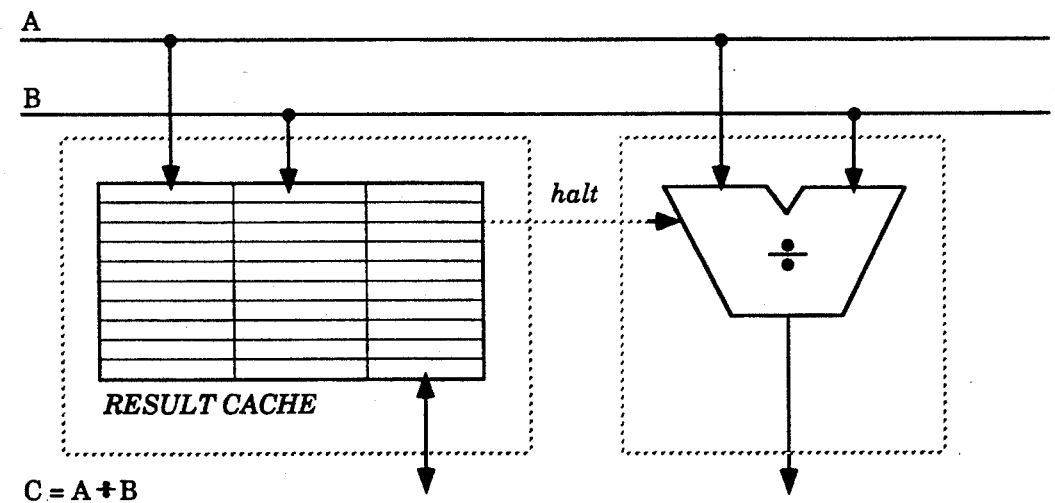
Figure 4:
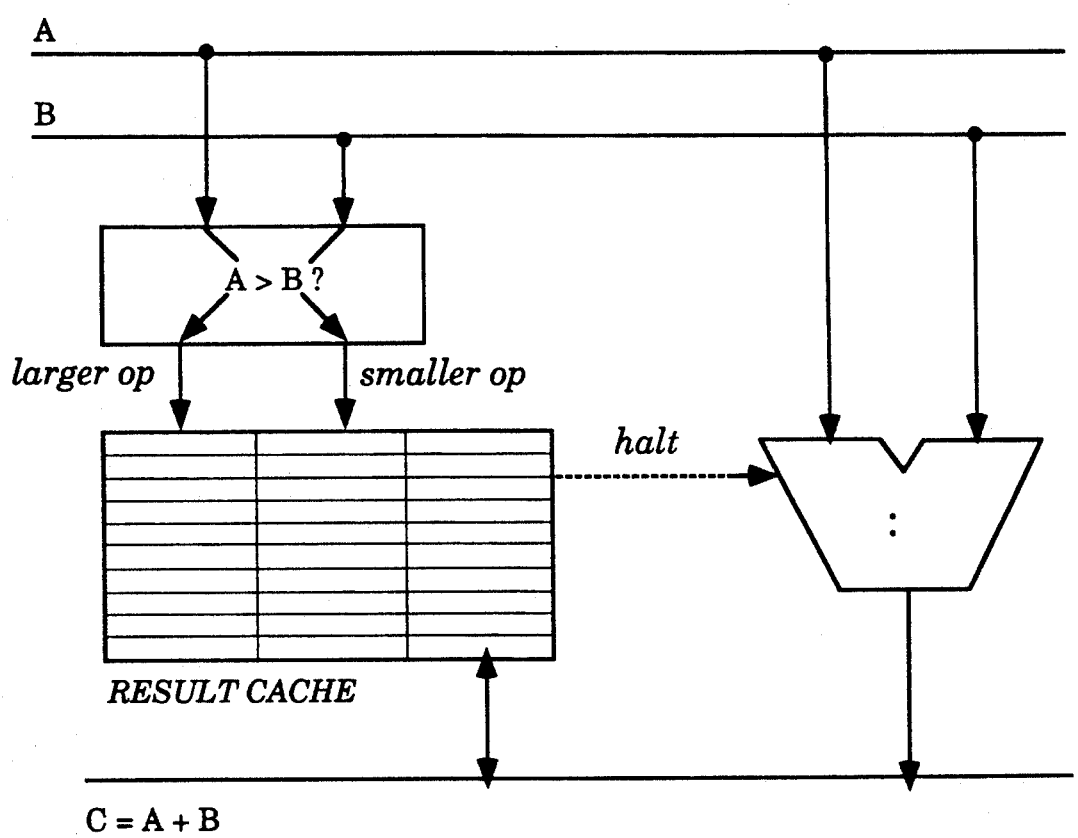
FIG. 4 illustrates an alternate embodiment of the present invention in which permutations of operands are used.
Figure 5:
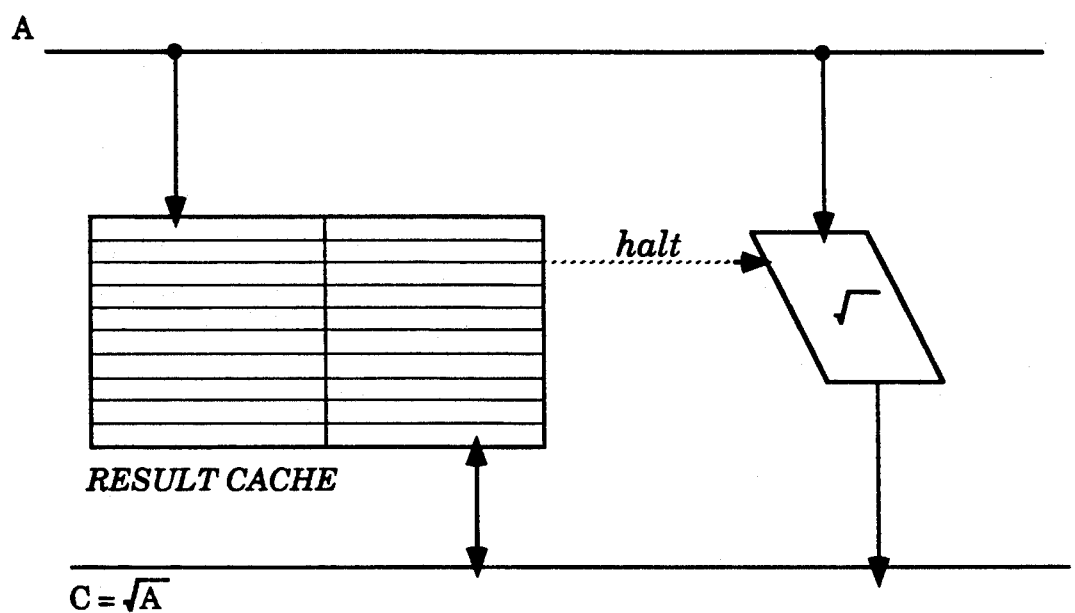
FIG. 5 illustrates an alternative embodiment of the present invention in which the invention is made to function for a single-operand arithmetic unit.

FIG. 1 shows result cache 10 receives operands A20 and B30 as the arithmetic unit 40 receives operands A20 and B30. If the operands pair is found in the cache, the corresponding result 50 is output and a halt signal 60 is sent to the arithmetic unit 40 to halt processing of the arithmetic unit, as the result has been already output by the result cache. As illustrated in FIG. 2, a single result cache may contain operand pair and results for different arithmetic units. An additional field 100 is added to the cache 110 to identify the type of arithmetic unit and the arithmetic operation to be performed using the operands 120, 130. As illustrated in FIG. 3, the result cache 220 may be packaged either together with, or separately from the arithmetic unit 230. FIG. 4 illustrates how the result cache may permute the operands for more efficient storage. For example, for commutative operations such as multiplication and addition, order is unimportant. Thus, a single entry in the result cache is used for the operations, in which the operands differ simply by reason of order. The efficiency of the cache can be increased by ordering the operand pairs according to the smaller operand. Similarly, the result cache may operate on a single operand rather than a pair of operands as illustrated in FIG. 5.

Referring back to FIG. 1, if the operand pair is not found in the result cache 10, the arithmetic unit 40 is allowed to complete the arithmetic operation for generation of the result. The result may then be placed in the result cache using a cache replacement algorithm, such as those discussed in John L. Hennessy and David A. Patterson, *Computer Architecture, A Quantitative Approach* (1990, Morgan, Kaufmann Publishers, Inc.) pgs. 411-412. The cache replacement algorithms will vary according to the type of data and arithmetic unit, as well as the type of cache. For example, in a set-associative cache, a least recently used method may be employed, wherein the block (e.g., operand pair/result) replaced is one that had been unused for the longest period of time. Further, the present invention is not limited in the type of cache to be used, such as direct mapped, fully associative or set associative caches. For more information see, *Computer Architecture, A Quantitative Approach*, pgs. 408-409.

The operands are used to generate an index into the cache. The operands are further used to generate the tag which is used to verify cache access. For example, an index may be generated by exclusive ORing of the operands together and using the result as the index. However, it should be obvious to one skilled in the art that the process for generating the tag or index can vary according to the arithmetic unit and range of operands. The tag generated should uniquely identify the operand pair in order to identify the correct result for an arithmetic operation which is stored in the cache.

Figure 6E:
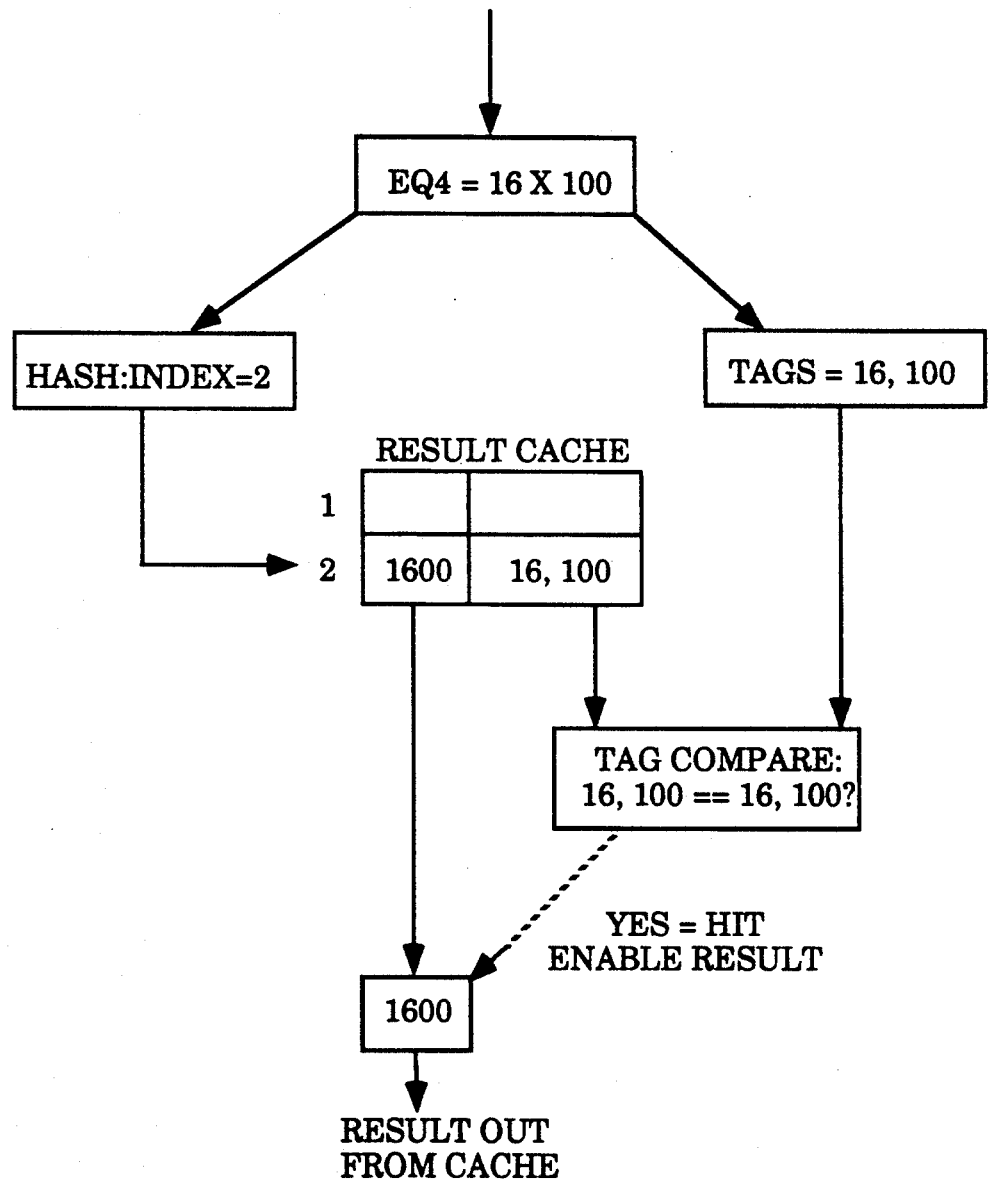

The following discusses a simple example utilizing a small result cache consisting of two entries as shown in FIG. 6a. Each entry is labelled with an index; in this case 1 and 2. For purposes of illustration, a set of operations to be performed in the form a×b are as shown:

$$147 \times 4 \qquad \text{eq1}$$

$$317 \times 24 \qquad \text{eq2}$$

$$16 \times 100 \qquad \text{eq3}$$

Each equation is mapped to an entry (either 1 or 2) in order to determine where to look for it in the cache. One way to do this might be to use Algorithm A, FIG. 6b. Algorithm A arranges the operations according to whether the operands are odd or even. Alternatively, one might use a method like that shown in Algorithm B (FIG. 6b), where the cache index is determined according to the rightmost digit of operand a.

The algorithm that turns the operands into an index is referred to as a hashing function. FIG. 6c shows the index that is generated by applying the two example hashing functions to each of the equations eq1, eq2, and eq3. Once a hashing function is generated, each operand pair will yield an index giving its unique positions within the cache. Using Algorithm A as the hashing function, equations eq1 and eq2 map to cache location 1, while equation eq3 maps to cache location 2. At each location, the result of the operation is stated. To disambiguate multiple equations that map to the same location, a cache tag is stored along with each result, each cache tag consisting of the two operands. After using hashing function A to store the three equations, the cache will look like that of FIG. 6d. It would be noted that equation eq1 (147×4) was displaced by equation eq2 (317×24), as both mapped to cache entry 1.

When a new equation is to be computed, its operands are first hashed to provide an index into the cache. The indexed cache location is then accessed to yield a cache result and a cache tag. The tag is checked against the operands of the equation to determine whether there is a hit (result valid for this equation) or a miss (result not valid). This process is summarized by FIG. 6e, where a new equation eq4, identical to eq3, yields a cache hit.

Figure 6F:
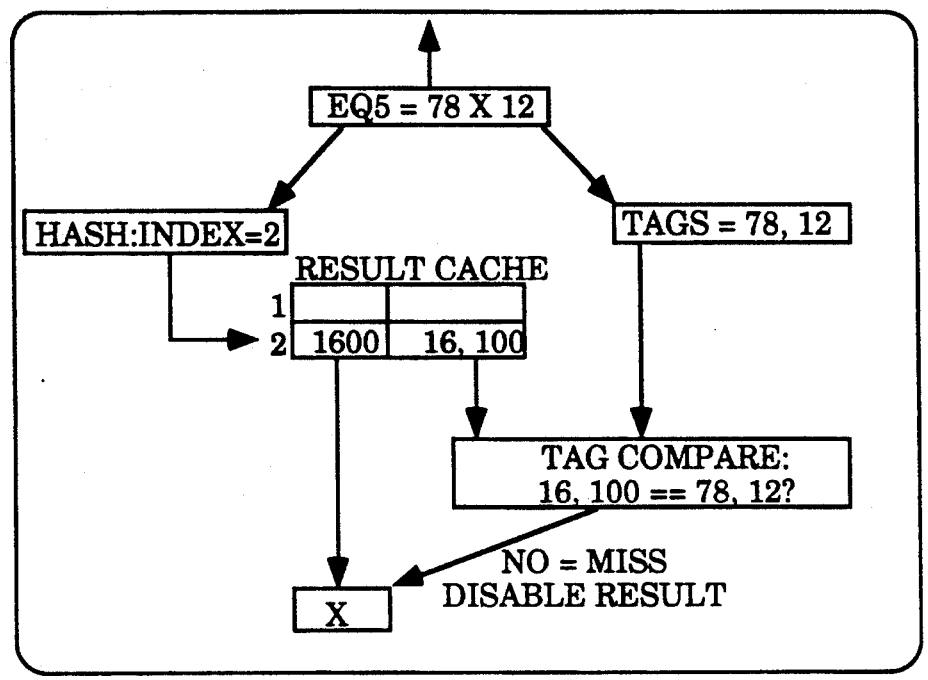
Figure 6F:
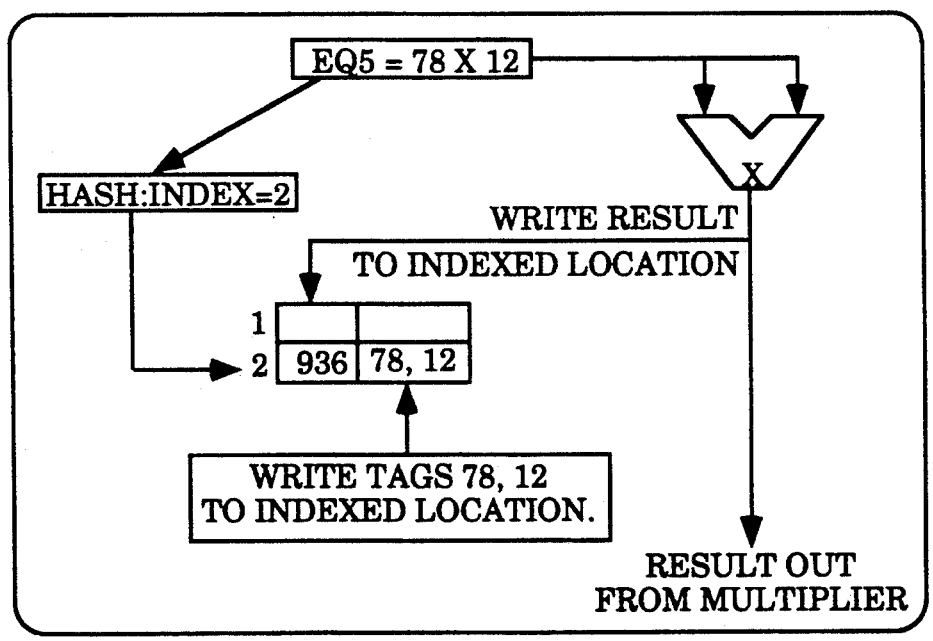

Had the equation not already existed in the cache, the resulting cache miss would then cause the result, generated by a multiplier, to be written to the appropriate cache location, along with the new tags. FIG. 6f summarizes this process.

In the above illustration, the operands were integers. A different approach may be taken for generating an index from two floating-point numbers. It is desirable that a hashing algorithm is chosen such that the most commonly used floating-point number pairs will be evenly distributed within the result cache. For instance, suppose the floating-point numbers span the range from $1.0 \times 10^{-9}$ to $1.0 \times 10^{10}$, and the result cache has room for 20 entries. One approach might be to hash on only the first of every number pair, and allocate one cache entry to each power of ten in the floating-point range. That is, for every number pair in the form $(a \times 10^i) \times (b \times 10^j)$, the targeted cache entry would be index = $i + 10$. Because i is restricted to the range $(-9, 10)$, the index will be a unique numbered entry between 1 and 20 inclusive.

This, however, would result in a poor hashing algorithm. Typically, floating-point numbers tend to be near $1.0 \times 10^0$, with the distribution falling off as the exponent gets farther from zero in either direction. Therefore, with the above hashing algorithm, most number pairs would collide near the middle of the result cache, while the top and bottom of the cache would remain relatively unused.

Utilizing knowledge regarding floating-point numbers and their distribution, a more intelligent hashing algorithm for number pairs destined for a floating-point multiplication unit may be developed. For example, floating-point numbers can be characterized according to the following: (1) a floating-point number consists of three parts: a sign, a mantissa, and an exponent; (2) most number pairs consist of positive numbers; (3) most consecutive number pairs tend to be near the same magnitude; (4) mantissae tend to be evenly distributed, with a higher-than-average number of them equal to zero; and (5) many floating-point numbers tend to be near $1.0 \times 10^0$, with the distribution falling off as the exponent gets farther from zero in either direction.

From the above characterizations, the following can be extrapolated: (a) Item 2 indicates to ignore the sign when hashing; (b) Item 4 indicates that if only a finite number of mantissa bits are used, the leftmost bits should be used first; (c) Item 5 indicates that if only a finite number of exponent bits are used, the rightmost bits should be used first.

Figure 7A:
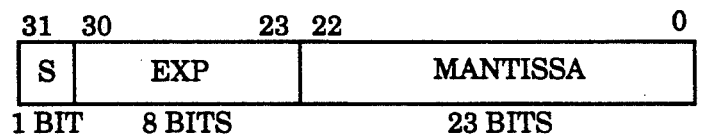
FIGS. 7a and 7b illustrate an exemplary hashing algorithm to be utilized for floating point-operands.
Figure 7B:
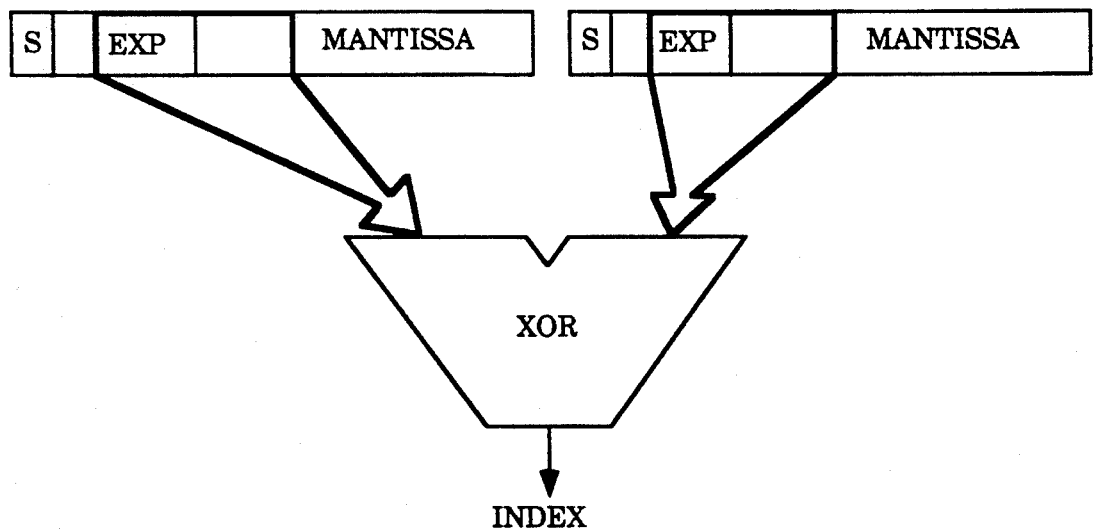

A 32-bit floating-point number usually has one bit for the sign, 8 bits of exponent, and 23 bits of mantissa, arranged as shown in FIG. 7a. To address a 1024-entry cache, for example, a 10-bit slice from the center of the word, using rightmost bits of the exponent field and leftmost bits from the mantissa field is used. Because a hashing function is performed on a pair of numbers, rather than a single number, a portion from each operand is extracted and exclusived or together to form the index, as shown in FIG. 7b.

Figure 8:
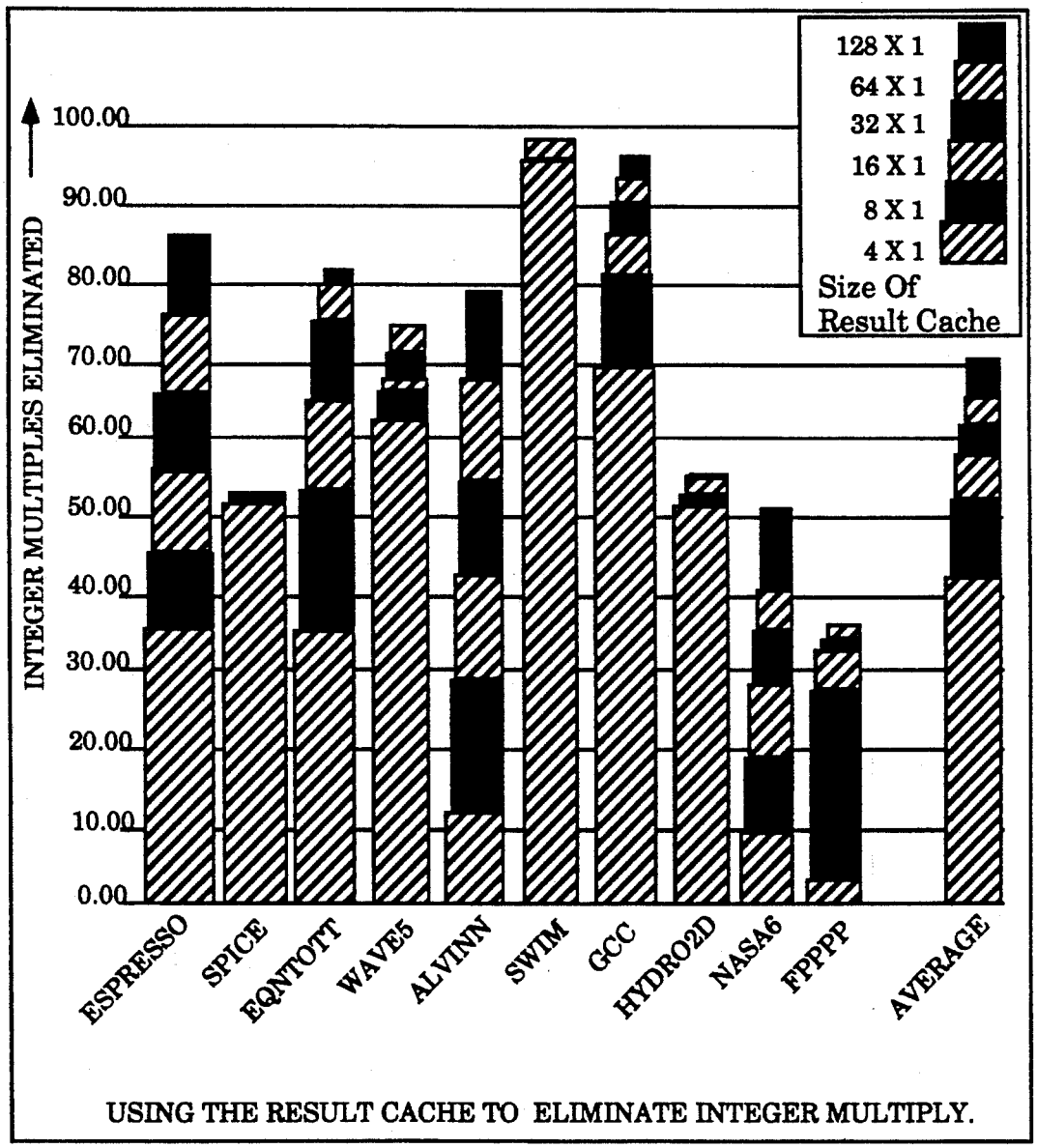
FIG. 8 illustrates the time savings enjoyed through the utilization of the result cache of the present invention.

The benefits enjoyed by using the result cache of the present invention is illustrated in FIG. 8 which shows the percent of cache hits in the result cache for integer multiplication operations. As noted by the legend, the graph shows the percent hits for different result cache sizes.

While the invention has been described in conjunction with the preferred embodiment, it is evident that numerous alternatives, modifications, variations and uses will be apparent to those skilled in the art in light of the foregoing description.

What is claimed is:

1. In a complex arithmetic unit for performing time consuming arithmetic operations for one or more operands, a result cache which operates in parallel with said arithmetic unit for minimizing the need to perform time consuming arithmetic operations, comprising:
    a cache memory for storing at least one result for at least one arithmetic operation performed on at least one operand, each of said results identified by a cache tag generated from the operand of the arithmetic operation;
    cache memory control means coupled to the cache memory and the arithmetic unit for receiving the operands of the arithmetic operation to be performed, generating a cache index from the operands received and accessing the cache according to the cache index generated, said means outputting the result stored and issuing a halt signal to the arithmetic unit when the cache tag is found to exist in the cache, said halt signal causing the arithmetic unit to stop processing of the arithmetic operation;
    whereby concurrent with the arithmetic unit processing the operands to generate the result, the result cache is accessed according to the cache index and, if the result for an arithmetic operation of specific operands exists in the cache, the result rapidly output from the cache and the processing of the arithmetic unit is halted, and if the result is not located in the result cache, the arithmetic unit continues processing to generate the result.

2. The result cache as set forth in claim 1, further comprising a cache replacement means which receives the result generated by the arithmetic unit and places the result in the cache for subsequent access, whereby results not found in the cache and therefore generated by the arithmetic unit are placed in the cache for possible subsequent access.

3. The result cache as set forth in claim 1, wherein the result cache is packaged together with said complex arithmetic unit in one package.

4. The result cache as set forth in claim 1, wherein the result cache is packaged separately from said complex arithmetic unit.

5. The result cache as set forth in claim 1, wherein the result cache operates in parallel with a plurality of arithmetic units.

6. The result cache as set forth in claim 5, wherein said result cache further identifies each result by the type of arithmetic process performed to generate each result, said cache memory control means accessing the cache memory according to the cache index and type of arithmetic process.

7. The result cache as set forth in claim 1, wherein said cache memory is set associative whereby a result can be stored in a predetermined set of locations in the cache, said result further identified by a tag which identifies the result within a given set.

8. The result cache as set forth in claim 7, wherein if the index in the cache memory is full, the cache replacement means replaces the least recently accessed member of the set with the result generated by the arithmetic unit.

9. In a complex arithmetic unit for performing time consuming arithmetic operations for one or more operands, a process for minimizing the need to perform said time consuming arithmetic operations, comprising the steps of:
    storing at least one result for at least one arithmetic operation performed on at least one operand in a cache memory, each of said results identified by a cache tag generated from the operands of the arithmetic operation and stored in a position denoted by an index generated from the operands of the arithmetic operation;
    generating a cache tag from the operands of the arithmetic operation to be performed;
    accessing the cache memory according to the cache index generated;
    if the cache tag is found to exist in the cache,
        outputting the result stored, and
        issuing a signal to halt processing by the arithmetic unit;
    whereby if the result for an arithmetic operation of specific operands exists in the cache, the result rapidly generated by accessing the result cache and the processing of the arithmetic unit is halted, and if the result is not located in the result cache, the arithmetic unit continues processing to generate the result.

10. The process as set forth in claim 9, further comprising the step of placing the result in the cache for subsequent access, whereby results not found in the cache and therefore generated by the arithmetic unit are placed in the cache for possible subsequent access.

11. The process as set forth in claim 10, wherein if said cache is full, replacing the least recently accessed result with the result generated by the arithmetic unit.

12. The process as set forth in claim 9, wherein the step of storing includes the step of receiving said results from a plurality of arithmetic units coupled to said result cache.

13. The process as set forth in claim 12, further comprising the step of identifying each of said results by the type of arithmetic process performed to generate each result, said step of accessing the cache memory further comprises accessing the cache memory according to the cache index and type of arithmetic process.

14. In a complex arithmetic unit for performing time consuming arithmetic operations for one or more operands, a result cache for minimizing the need to perform said time consuming arithmetic operations, said result cache comprising:

a cache memory for storing at least one result for at least one arithmetic operation performed on at least one operand, each of said results identified by a cache tag generated from the operand of the arithmetic operation;

means for receiving the operands of the arithmetic operation to be performed, said means receiving the operands concurrently with the arithmetic unit which performs the arithmetic operation;

means for generating a cache tag from the operands received;

means for generating a cache index from the operands received;

result cache access means for accessing the cache according to the cache index generated, said means outputting the result stored if the tag is found to exist in the cache;

arithmetic unit control means for issuing a halt signal to the arithmetic unit the cache tag is found to exist in the cache, said halt signal causing the arithmetic unit to stop processing of the arithmetic operation;

cache replacement means for storing the cache tag and the result generated by the arithmetic unit in the cache memory if the cache tag is found not to exist in the cache;

whereby if the result for an arithmetic operation of specific operands exists in the cache, the result rapidly generated by accessing the result cache and the processing of the arithmetic unit is halted, and if the result is not located in the result cache, the arithmetic unit continues processing to generate the result.

15. The result cache as set forth in claim 14, wherein the result cache is packaged together with said complex arithmetic unit in one package.

16. The result cache as set forth in claim 14, wherein the result cache is packaged separately from said complex arithmetic unit.

17. The result cache as set forth in claim 14, wherein a single result cache operates in parallel with a plurality of arithmetic units.

18. The result cache as set forth in claim 17, wherein said result cache further identifies each result by the type of arithmetic process performed to generate each result, said cache memory control means accessing the cache memory according to the cache index and type of arithmetic process.

19. The result cache as set forth in claim 14, wherein said cache memory is set associative whereby a result can be stored in a predetermined set of locations in the cache, said result further identified by a tag which identifies the result within a given set.

* * * * *

UNITED STATES PATENT AND TRADEMARK OFFICE
CERTIFICATE OF CORRECTION

PATENT NO. : 5,260,898
DATED : November 9, 1993
INVENTOR(S) : Richardson It is certified that error appears in the above-identified patent and that said Letters Patent is hereby corrected as shown below:

In column 7 at line 30, please delete " unit the " and insert -- unit when the --.

Signed and Sealed this

Eleventh Day of November, 1997

*Attest:*

BRUCE LEHMAN

*Attesting Officer*  *Commissioner of Patents and Trademarks*